United States Patent
Huang et al.

(10) Patent No.: US 12,177,310 B2
(45) Date of Patent: Dec. 24, 2024

(54) METHOD AND APPARATUS FOR PROCESSING NOTIFICATION TRIGGER MESSAGE

(71) Applicant: JINGDONG TECHNOLOGY HOLDING CO., LTD., Beijing (CN)

(72) Inventors: Bin Huang, Beijing (CN); Rui Ma, Beijing (CN); Kui Xiao, Beijing (CN)

(73) Assignee: JINGDONG TECHNOLOGY HOLDING CO., LTD., Beijing (CN)

( * ) Notice: Subject to any disclaimer, the term of this patent is extended or adjusted under 35 U.S.C. 154(b) by 0 days.

(21) Appl. No.: 18/020,351

(22) PCT Filed: May 25, 2021

(86) PCT No.: PCT/CN2021/095752
§ 371 (c)(1),
(2) Date: Feb. 8, 2023

(87) PCT Pub. No.: WO2022/041879
PCT Pub. Date: Mar. 3, 2022

(65) Prior Publication Data
US 2023/0269304 A1 Aug. 24, 2023

(30) Foreign Application Priority Data
Aug. 31, 2020 (CN) .......................... 202010896000.X

(51) Int. Cl.
*H04L 67/55* (2022.01)
*H04L 67/5683* (2022.01)

(52) U.S. Cl.
CPC .......... *H04L 67/55* (2022.05); *H04L 67/5683* (2022.05)

(58) Field of Classification Search
CPC ............................ H04L 67/55; H04L 67/5683
See application file for complete search history.

(56) References Cited

U.S. PATENT DOCUMENTS 9,479,387 B2　10/2016　Arabo et al.
9,723,459 B2 *　8/2017　Yariv .................... H04L 51/224
(Continued)

FOREIGN PATENT DOCUMENTS

CN　　1925685 B　　3/2007
CN　　104346202 A　　2/2015
(Continued)

OTHER PUBLICATIONS

International Search Report and Written Opinion for Related Application No. PCT/CN2021/095752 dated Aug. 18, 2021 (15 pages, including an English translation).

(Continued)

*Primary Examiner* — Javier O Guzman
(74) *Attorney, Agent, or Firm* — Michael Best & Friedrich LLP

(57) ABSTRACT

The present application discloses a method and apparatus for processing a notification trigger message, which method and apparatus relate to the technical field of computers. One specific implementation of the method comprises: receiving a notification trigger message formed by triggering a notification, wherein the notification trigger message includes an identifier of a current push message corresponding to the notification; determining whether the identifier of the current push message exists in a message cache, and if the identifier of the current push message exists in a message cache, ignoring the notification trigger message, wherein the message cache is used for storing an identifier of a push message corresponding to a notification that has been responded to. The implementation can avoid multiple responses of a client to an identical notification.

9 Claims, 5 Drawing Sheets

(56) References Cited

U.S. PATENT DOCUMENTS

| | | | | |
|---|---|---|---|---|
| 10,834,219 | B1* | 11/2020 | Justin | H04L 67/62 |
| 11,082,514 | B2* | 8/2021 | Bejar | G06F 40/30 |
| 11,924,213 | B2* | 3/2024 | Felice-Steele | G06F 16/2379 |
| 2004/0122735 | A1* | 6/2004 | Meshkin | G06Q 30/0265 |
| | | | | 705/14.62 |
| 2009/0282256 | A1* | 11/2009 | Rakic | H04L 63/12 |
| | | | | 713/176 |
| 2012/0254390 | A1* | 10/2012 | Choi | H04L 51/23 |
| | | | | 709/223 |
| 2013/0332470 | A1 | 12/2013 | Saito | |
| 2014/0304238 | A1* | 10/2014 | Halla-Aho | H04L 51/212 |
| | | | | 707/692 |
| 2015/0163178 | A1* | 6/2015 | Jeon | H04L 67/55 |
| | | | | 709/206 |
| 2015/0207893 | A1* | 7/2015 | Lee | H04L 12/1859 |
| | | | | 709/206 |
| 2017/0220283 | A1* | 8/2017 | Zhang | H04N 19/423 |
| 2018/0188899 | A1* | 7/2018 | Nigam | G06Q 10/1095 |
| 2018/0189343 | A1* | 7/2018 | Embiricos | G06F 16/2358 |
| 2019/0014187 | A1* | 1/2019 | Choi | H04L 67/34 |
| 2019/0207887 | A1* | 7/2019 | Kasheff | H04L 51/212 |
| 2019/0391779 | A1* | 12/2019 | Mouyade | G09G 5/12 |
| 2020/0245104 | A1* | 7/2020 | Moon | H04L 67/55 |
| 2021/0067598 | A1* | 3/2021 | Bhat | H04L 67/63 |
| 2021/0112130 | A1* | 4/2021 | LeClair | G06F 16/957 |

FOREIGN PATENT DOCUMENTS

| | | |
|---|---|---|
| CN | 104580409 A | 4/2015 |
| CN | 105045468 A | 11/2015 |
| CN | 105099989 A | 11/2015 |
| CN | 105471714 A | 4/2016 |
| CN | 105843599 A | 8/2016 |
| CN | 106657299 A | 5/2017 |
| CN | 107483728 A | 12/2017 |
| CN | 107707774 A | 2/2018 |
| CN | 107967108 A | 4/2018 |
| CN | 108228605 A | 6/2018 |
| CN | 108459758 A | 8/2018 |
| CN | 108985092 A | 12/2018 |
| CN | 109783333 A | 5/2019 |
| CN | 110647502 A | 1/2020 |
| CN | 112118352 A | 12/2020 |

OTHER PUBLICATIONS

Chinese Patent Office Action for Related Application No. 202010896000.X dated Mar. 12, 2021 (2 pages).

* cited by examiner

METHOD AND APPARATUS FOR PROCESSING NOTIFICATION TRIGGER MESSAGE

CROSS-REFERENCE TO RELATED APPLICATION(S)

This is a U.S. national stage entry of International Patent Application No. PCT/CN2021/095752, filed on May 25, 2021, which claims priority to Chinese Patent Application No. 202010896000.X. filed on Aug. 31, 2020, the entire contents of each of which are fully incorporated herein by reference.

TECHNICAL FIELD

The present disclosure relates to the technical field of computers, in particular, a method and apparatus for processing a notification trigger message.

BACKGROUND ART

A terminal is generally configured with a notification function, and a user can know a notification in the terminal through a notification icon on the Status Bar at the top of the terminal. The user can also open a page or an application corresponding to the notification by clicking the notification content in the Notification Bar.

In the process of implementing the present disclosure, the inventor discovered that the prior art has at least the following problems: when a user clicks an identical notification multiple times in a Notification Bar, multiple responses of the client to the notification click event may be triggered, which not only wastes the system resources but also reduces the user experiences of the terminal.

SUMMARY OF THE INVENTION

For this reason, the embodiments of the present disclosure provide a method and apparatus for processing a notification trigger message, capable of avoiding multiple responses of a client to an identical notification.

According to one aspect of the present disclosure, the embodiments of the present disclosure provide a method for identifying an abnormal behavior, comprising:
  receiving a notification trigger message formed by triggering a notification, wherein the notification trigger message includes an identifier of a current push message corresponding to the notification;
  determining whether the identifier of the current push message exists in a message cache, and if the identifier of the current push message exists in the message cache, ignoring the notification trigger message, wherein the message cache is used for storing an identifier of a push message corresponding to a notification that has been responded to. Optionally,
The message cache is used for storing a historical timestamp of a push message corresponding to a notification that has been responded to;
  the notification trigger message also includes a current timestamp.
  if the identifier of the current push message exists in the message cache, the method further comprises:
  updating the historical timestamp of the current push message in the message cache to the current timestamp.

Optionally, the method further comprises:
  if the identifier of the current push message does not exist in the message cache, storing the identifier of the current push message in the message cache.
Optionally, the notification trigger message also includes a current timestamp;
  if the identifier of the current push message does not exist in the message cache, the method further comprises:
  storing the current timestamp in the message cache, wherein the identifier of the current push message corresponds to the current timestamp thereof.
Optionally, before storing the identifier of the current push message in the message cache, the method further comprises:
  determining whether the content stored in the message cache reaches a preset storage threshold, and if the content stored in the message cache reaches the preset storage threshold, deleting the earliest historical timestamps and the identifiers of the corresponding push messages in the message cache.
Optionally, if the identifier of the current push message exists in the message cache, the method further comprises:
  determining whether a time interval between the historical timestamp and the current timestamp of the current push message is smaller than a preset interval threshold, and if the time interval is smaller than the preset interval threshold, executing the ignoring of the notification trigger message.
Optionally, the method further comprises:
  if the identifier of the current push message does not exist in the message cache, determining whether a terminal where the message cache is located satisfies the preset running conditions, and if the terminal does not satisfy the running conditions, executing the ignoring of the notification trigger message.
Optionally, the running conditions include any one or more of the following: the CPU utilization rate is less than a preset first threshold, the memory usage amount is less than a preset second threshold, the disk usage amount is less than a preset third threshold, a current terminal interface is not a game running interface, and a current terminal interface is not a video playing interface.

According to one aspect of the present disclosure, the embodiments of the present disclosure provide an apparatus for processing a notification trigger message, comprising:
  a message receiving module configured to receive a notification trigger message formed by triggering a notification, wherein the notification trigger message includes an identifier of a current push message corresponding to the notification;
  a message ignoring module configured to determine whether the identifier of the current push message exists in a message cache, and if the identifier of the current push message exists in the message cache, ignore the notification trigger message, wherein the message cache is used for storing an identifier of a push message corresponding to a notification that has been responded to.

According to one aspect of the present disclosure, the embodiments of the present disclosure provide an electronic device, comprising:
  one or more processors;
  a storage device for storing one or more programs which, when executed by the one or more processors, cause the one or more processors to implement the method according to any of the above embodiments.

According to one aspect of the present disclosure, the embodiments of the present disclosure provide a computer-readable medium storing thereon a computer program which, when executed by the processor(s), implements the method according to any of the above embodiments.

When a terminal receives a push message distributed by a push server, a notification corresponding to the push message will be displayed on the terminal, and a notification trigger message will be generated when a user clicks the notification. Therefore, a notification and a push message have a correspondence relationship. By judging whether the identifier of a current push message exists in a message cache, it can be judged whether a notification corresponding to the current push message has been responded to. Therefore, one embodiment in the above disclosure has the following advantages or beneficial effects: whether a current push message needs to be processed is determined according to the identifier of the current push message, and if it is determined to process the current push message, a notification trigger message corresponding to the current push message is ignored. Therefore, multiple responses of a client to an identical notification can be avoided, and thereby the system resources are saved and the user experiences of the terminal are improved.

Further effects achieved by the above non-conventional optional manners will be explained below in conjunction with specific embodiments.

DESCRIPTION OF THE DRAWINGS

Drawings are used for better understandings of the present disclosure, but do not construe improper definitions of the present disclosure, wherein.

DESCRIPTION OF THE EMBODIMENTS

Explanations about the exemplary embodiments of the present disclosure will be made below with reference to the drawings, including various details of the embodiments of the present disclosure so as to help to understand, and the exemplary embodiments should be regarded as merely exemplary. Therefore, a person of ordinary skills in the art should recognize that various changes and modifications can be made to the embodiments described herein without departing from the scope and spirit of the present disclosure. Also, for the sake of clarity and conciseness, descriptions of well-known functions and structures are omitted in the following descriptions.

Figure 1:
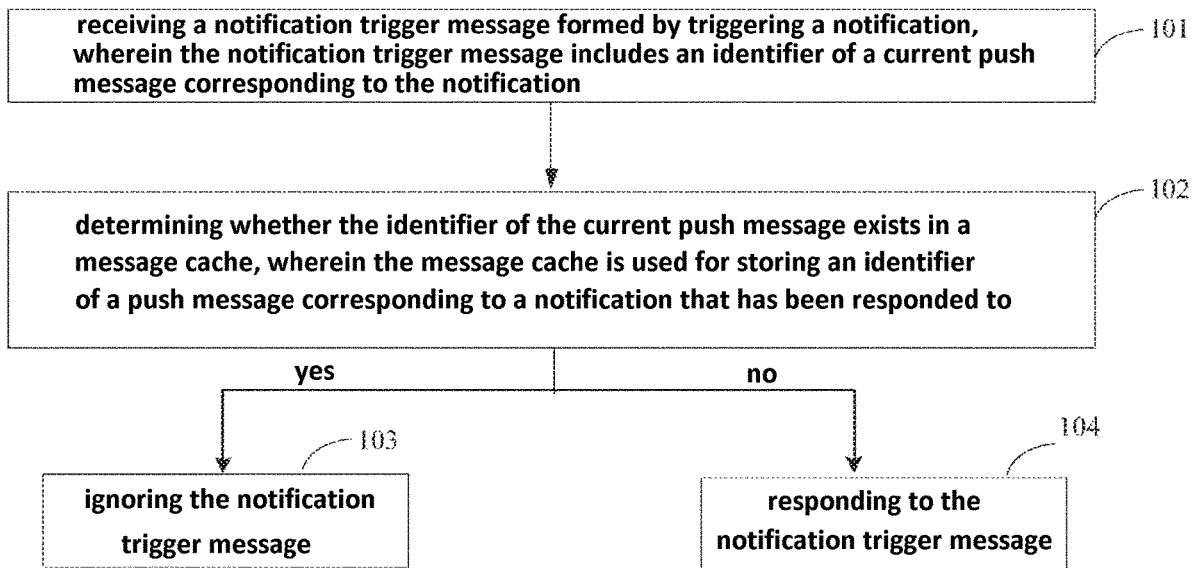
FIG. 1 is a flowchart of a method for processing a notification trigger message provided in one embodiment of the present disclosure.

The embodiments of the present disclosure provide a method for processing a notification trigger message, as shown in FIG. 1, comprising:

Step 101: Receiving a notification trigger message formed by triggering a notification, wherein the notification trigger message includes an identifier of a current push message corresponding to the notification.

The method according to the embodiments of the present application can be applied to the clients of applications. The applications may include various shopping Apps (applications), audio-visual Apps, navigation Apps, and the like. The push server of an application can send a push message to a terminal on which the application is installed. The push message includes an identifier of the push message corresponding to the push message. The identifier of a push message is used for uniquely determining a corresponding push message in a system.

When a terminal receives a push message, the notification content will be displayed in the Notification Bar of the terminal. Notification trigger message will be generated when a user clicks the notification content in the Notification Bar. Therefore, a push message and a notification may have a 1:1 correspondence relationship. In a case where a user clicks an identical notification multiple times successively, the identical notification may correspond to multiple notification trigger messages. A notification and notification trigger message(s) may have a 1:1 correspondence relationship or may have a 1:n correspondence relationship.

Step 102: Determining whether the identifier of the current push message exists in a message cache, wherein the message cache is used for storing an identifier of a push message corresponding to a notification that has been responded to. One message cache may be configured, which stores an identifier of a push message corresponding to a notification that has been responded to. If the identifier of the current push message is not found in the message cache, the current push message has not been processed, and it is determined that the identifier of the current push message does not exist in the message cache. If the identifier of the current push message is found in the message cache, the current push message has been processed, and it is determined that the identifier of the current push message exists in the message cache. The above message cache can be stored in a hard disk, a cache, a memory or an external storage. By looking up the identifier of the current push message or the current notification identifier in the message cache, it can be determined whether the current push message needs to be processed. To sum up, the embodiments of the present disclosure do not impose any limitations on how to determine whether the current push message needs to be processed.

Step 103: Ignoring the notification trigger message. Ignoring the notification trigger message may be not processing a notification corresponding to the notification trigger message. For example, discarding the notification trigger message, not performing an operation of opening a specified page which is a page specified by the notification corresponding to the notification trigger message, and so on.

Step 104: Responding the notification trigger message.

In the embodiments of the present disclosure, whether or not the current push message needs to be processed is determined according to the identifier of the current push message, and if the identifier of the current push message exists in the message cache, the notification trigger message corresponding to the current push message is ignored. Therefore, multiple responses of the client to an identical notification can be avoided, and troubles caused to the user by multiple responses to an identical notification can be alleviated.

In addition, statistical analyses of an application are generally made by a specified callback method. The callback method is deployed in a client of an application. If the client responds to an identical notification multiple times, statistical data related to the application may be inaccurate. In the embodiments of the present disclosure, multiple responses of the client to an identical notification can be avoided while improving the accuracy and reliability of the statistical data related to the application.

In one embodiment of the present disclosure, the message cache is used for storing a historical timestamp of a push message corresponding to a notification that has been responded to;
the notification trigger message also includes a current timestamp;
if the identifier of the current push message exists in the message cache, the method further comprises:
updating the historical timestamp of the current push message in the message cache to the current timestamp.

The message cache in the embodiment of the present disclosure simultaneously stores the identifier of the push message and the historical timestamp of the push message. The historical timestamp of the push message is used to represent the time when the push message was last called from a current moment. Through the historical time stamps of the push message, the historical call times of the push message can be specified, which facilitates the understanding of the execution circumstance of the push message. When the identifier of the current push message already exists in the message cache, it is necessary to update the historical timestamp of the current push message in the message cache to the current timestamp of the current push message.

In one embodiment of the present disclosure, if the identifier of the current push message does not exist in the message cache, the identifier of the current push message is stored in the message cache.

If the identifier of the current push message is not found in the message cache, then the current push message has not been processed, and the identifier of the current push message does not exist in the message cache. Therefore, it is necessary to execute the current push message and store the identifier of the current push message in the message cache. By storing the identifier of the current push message in the message cache, the current push message can be prevented from being repeatedly called subsequently.

In one embodiment of the present disclosure, the notification trigger message also includes a current timestamp;
if the identifier of the current push message does not exist in the message cache, the method further comprises:
storing the current timestamp in the message cache, wherein the identifier of the current push message corresponds to the current timestamp thereof.

If the identifier of the current push message is not found in the message cache, the identifier of the current push message does not exist in the message cache. In order to prevent the current push message from being repeatedly called subsequently, it is necessary to store the identifier of the current push message in the message cache.

In order to obtain the execution circumstance of the push message, the message cache simultaneously stores the identifier of the push message and the historical timestamp of the push message. Therefore, if the identifier of the current push message does not exist in the message cache, it is necessary to store both the identifier of the current push message and the current timestamp corresponding thereto in the message cache.

In one embodiment of the present disclosure, before storing the identifier of the current push message in the message cache, the method further comprises:
determining whether the content stored in the message cache reaches a preset storage threshold, and if the content reaches the present storage threshold, deleting the earliest historical timestamps and the identifiers of the corresponding push messages in the message cache.

An occupied storage space in the message cache can be compared with a preset storage threshold, and if it is greater than the storage threshold, the earliest historical timestamps in the message cache and the identifiers of the corresponding push messages are deleted.

When push message information in the message cache needs to be deleted, it is possible to determine the least recently used push messages according to the historical timestamps corresponding to the identifiers of the respective push messages stored in the message cache. Specifically, the push messages corresponding to the earliest historical timestamps in the message cache are taken as the least recently used push messages and, the earliest historical timestamps and the identifiers of the corresponding push messages in the message cache are deleted.

Generally, a message cache is disposed in a system, and before information of a current push message is inserted into a message cache, judgment on the space occupied by the message cache is made to ensure that the content stored in the message cache does not exceed a storage threshold.

Further, LruCache can be used to implement the method in the embodiment of the present application. LruCache is a cache using a cache policy of the LRU (Least Recently Used, the least recently used algorithm). When the content stored in LruCache reaches a preset storage threshold, LruCache can automatically remove information of the least recently used messages using the LRU algorithm, without requiring technicians to develop a relevant removing code. Therefore, the use of LruCache can facilitate the implementation of the method in the embodiment of the present application, and reduce the development workload of technicians.

Specifically, LruCache stores information of a push message. The information of a push message includes an identifier of the push message and a historical timestamp of the push message, wherein the identifier of the push message is used as a key (keyword), and the historical timestamp is used as a value. After receiving a notification trigger message, the client parses out the identifier and the current timestamp of a current push message in the notification trigger message. The client takes the identifier of the current push message as a key and the current timestamp as a value, and inserts information of the current push message into LruCache using a put method. If the put method returns a non-null value, it indicates that the identifier of the current push message already exists in LruCache, the notification click message associated with the identifier of the current push message is a duplicate message, and the notification trigger message should be discarded. If the put method returns a null value, it indicates that the identifier of the current push message is stored in LruCache at the first time, the push message associated with the identifier of the current push message is a message that needs to be processed, and subsequent operations such as interface jumping and statistical data analysis of the current push message are performed.

In one embodiment of the present disclosure, it is possible to set the capacity number of a message cache to a preset number threshold; determine whether or not the content stored in the message cache reaches the preset number threshold, and if the content stored in the message cache reaches the preset number threshold, delete the earliest historical timestamps and the identifiers of the corresponding push messages in the message cache.

For example, if the number threshold is 10, the message cache can accommodate information of up to 10 push messages. Information of a push message may include an identifier of the push message and a historical timestamp of the push message. When the number of push messages stored in the message cache reaches 10, the earliest historical timestamps and the identifiers of the corresponding push messages in the message cache are deleted.

It should be noted that: if the storage threshold or the number threshold is set too small, it will increase a risk that an identical push notification will be responded multiple times. However, if the storage threshold or the number threshold is set too large, it will result in a waste of memory.

Figure 2:
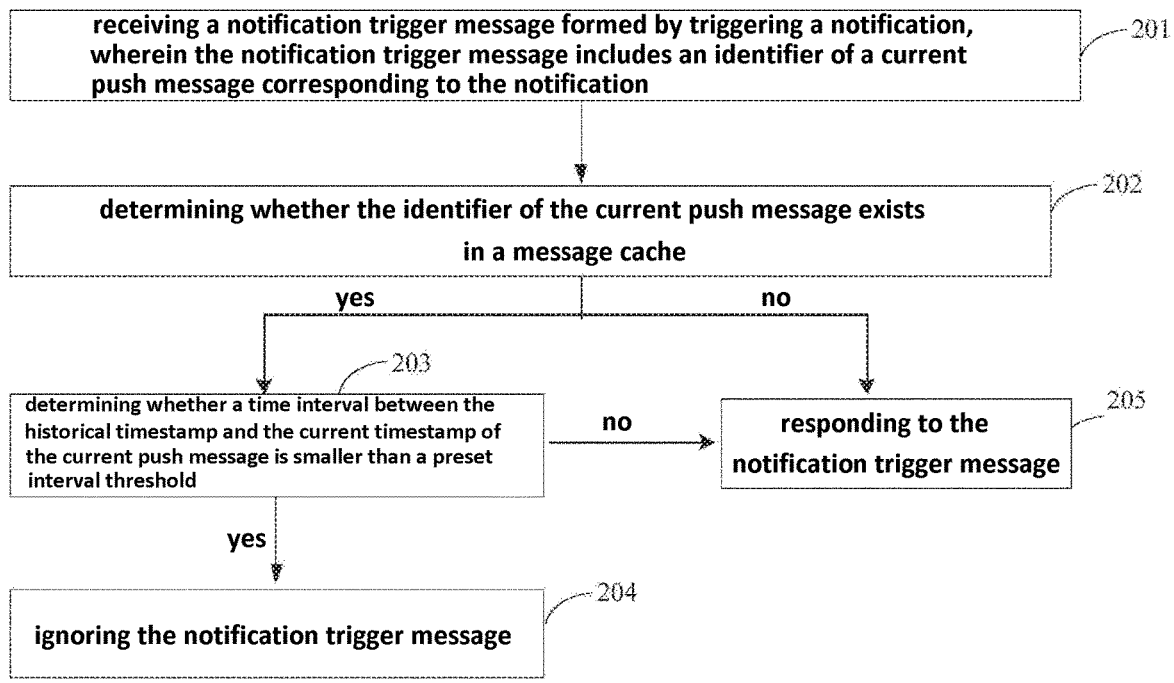
FIG. 2 is a flowchart of a method for processing a notification trigger message provided in another embodiment of the present disclosure.

FIG. 2 is a flowchart of a method for processing a notification trigger message provided in another embodiment of the present disclosure. As shown in FIG. 2, the method comprises:

Step 201: Receiving a notification trigger message formed by triggering a notification, wherein the notification trigger message includes an identifier of a current push message corresponding to the notification.

Step 202: Determining whether the identifier of the current push message exists in a message cache.

If the identifier of the current push message exists in the message cache, execute step 203; if the identifier of the current push message does not exist in the message cache, execute step 205.

Step 203: Determining whether a time interval between the historical timestamp and the current timestamp of the current push message is smaller than a preset interval threshold.

In the embodiment of the present disclosure, a time interval between the historical timestamp and the current timestamp of the current push message may be compared with a preset interval threshold, and if the time interval between the historical timestamp and the current timestamp of the current push message is smaller than the preset interval threshold, it indicates that: a user has quickly clicked an identical push notification within a relatively short period of time, the push notification is a duplicate notification and should not be executed, and step 204 is executed.

If the time interval between the historical timestamp and the current timestamp of the current push message is not smaller than the preset interval threshold, it indicates that: a user has clicked an identical push notification within a relatively long period of time, the user may be interested in the content of the notification, and step 205 is executed.

Step 204: Ignoring the notification trigger message.

Step 205: Responding to the notification trigger message.

In the embodiment of the present disclosure, whether the time interval between the historical timestamp and the current timestamp of the current push message is smaller than the preset interval threshold is determined on the basis of determining that the identifier of the current push message exists in the message cache. A time interval between the historical time stamp and the current time stamp of a current push message can represent a time interval between the last time when a user clicks the push message and the next time when the user clicks the push message, and whether to execute the notification trigger message is determined according to the time interval between the historical time stamp and the current time stamp of the current push message, which can further improve the user experiences.

Figure 3:
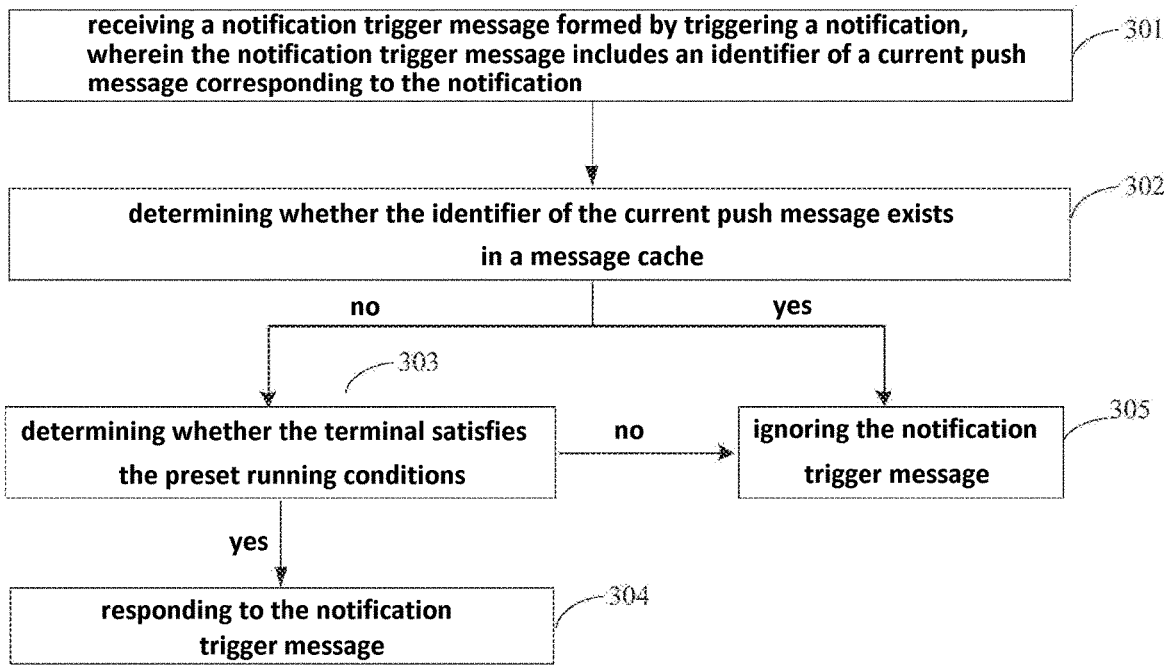
FIG. 3 is a flowchart of a method for processing a notification trigger message provided in a further embodiment of the present disclosure.

FIG. 3 is a flowchart of a method for processing a notification trigger message provided in a further embodiment of the present disclosure. As shown in FIG. 3, the method comprises:

Step 301: Receiving a notification trigger message formed by triggering a notification, wherein the notification trigger message includes an identifier of a current push message corresponding to the notification;

Step 302: Determining whether the identifier of the current push message exists in a message cache.

If the identifier does exist in the message cache, execute step 303; if the identifier exists in the message cache, execute step 305.

Step 303: Determining whether a terminal where the message cache is located satisfies the preset running conditions.

The running conditions include any one or more of the following: the CPU utilization rate is less than a preset first threshold, the memory usage amount is less than a preset second threshold, the disk usage amount is less than a preset third threshold, a current terminal interface is not a game running interface, and a current terminal interface is not a video playing interface.

If the terminal satisfies the running conditions, execute step 304; if the terminal does not satisfy the running conditions, execute step 305.

If the terminal where the message cache is located does not satisfy the preset running conditions, for example, the CPU utilization rate, the memory usage amount, or the disk usage amount of the terminal where the message cache is located is relatively large, responding to the notification trigger message may result in unresponsiveness and other phenomena of the system. For another example, when the current push message is a shopping app push message, and a current terminal interface is a game running interface, a video playing interface or the like, the user's operation of clicking the notification may be an erroneous operation, and responding to the notification trigger message may cause inconvenience to the user.

Step 304: Responding to the notification trigger message.

Step 305: Ignoring the notification trigger message.

In the embodiment of the present disclosure, whether the terminal where the current push message is located satisfies the preset running conditions is determined on the basis of determining that the identifier of the current push message does not exist in the message cache. If the terminal does not satisfy the preset running conditions, responding to the notification trigger message may result in unresponsiveness of the system, or the notification trigger message is more likely to be an erroneous operation of the user and should not be responded.

Figure 4:
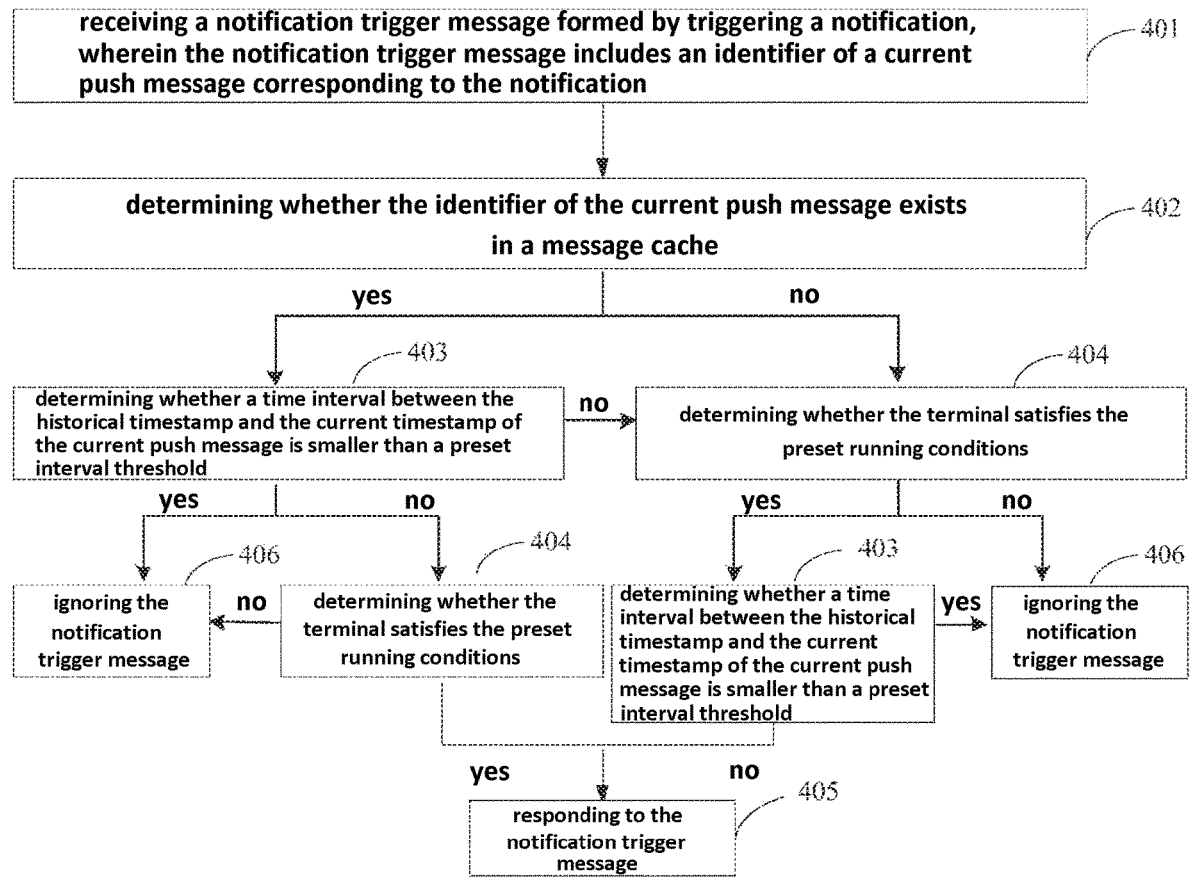
FIG. 4 is a flowchart of a method for processing a notification trigger message provided in yet another embodiment of the present disclosure.

FIG. 4 is a flowchart of a method for processing a notification trigger message provided in yet another embodiment of the present disclosure. As shown in FIG. 4, the method comprises:

Step 401: Receiving a notification trigger message formed by triggering a notification, wherein the notification trigger message includes an identifier of a current push message corresponding to the notification.

Step 402: Determining whether the identifier of the current push message exists in a message cache.

If the identifier exists, execute step 403; if the identifier does not exist, execute step 405.

Step 403: Determining whether a time interval between the historical timestamp and the current timestamp of the current push message is smaller than a preset interval threshold.

If the time interval is smaller than the preset interval threshold, execute step 405; if the time interval is not smaller than the preset interval threshold and step 404 has not been executed, execute step 404; if the time interval is not smaller than the preset interval threshold and step 404 has been executed, execute step 405.

Step 404: Determining whether a terminal where the message cache is located satisfies the preset running conditions.

If the preset operating conditions are satisfied and step 403 has not been executed, execute step 403; if the preset operating conditions are satisfied and step 403 has been executed, execute step 405; if the preset operating conditions are not satisfied, execute step 406.

Step 405: Responding to the notification trigger message.

Step 406: Ignoring the notification trigger message.

In the embodiment of the present disclosure, it is possible to consider whether the identifier of the current push message exists in the message cache, whether the time interval between the historical timestamp and the current timestamp of the current push message is smaller than a preset interval threshold, and whether the terminal where the current push message is located satisfies the preset operating requirements simultaneously to measure whether the notification trigger message should be ignored from different perspectives, which can better satisfy the user's requirements.

The method in one embodiment of the present disclosure comprises two steps: registering a push function and judging whether a current push message is a duplicate click message.

Figure 5:
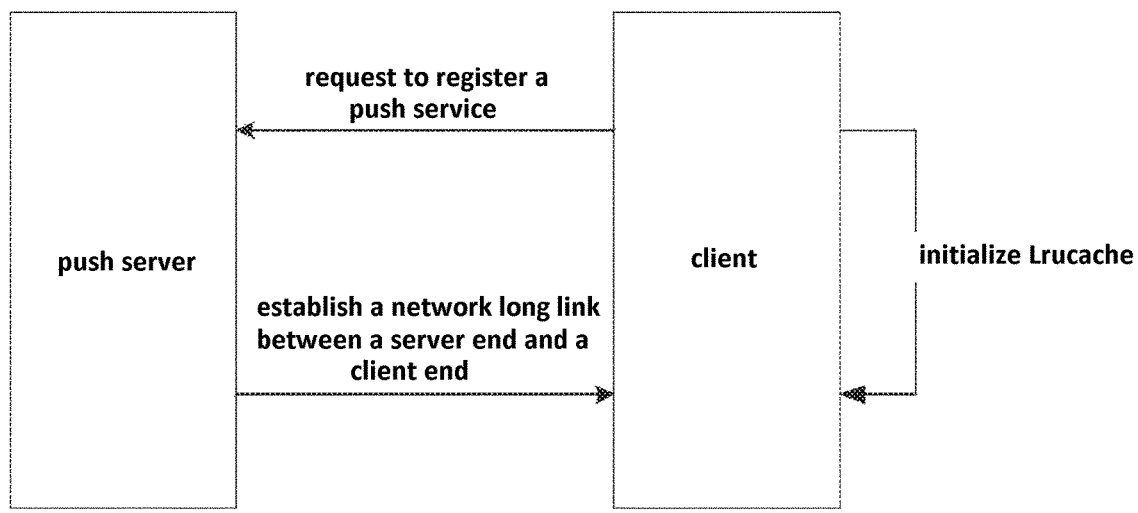
FIG. 5 is a flowchart of a method for processing the registering for a push function provided in one embodiment of the present disclosure.

FIG. 5 is a flowchart of a method for processing the registering for a push function provided in one embodiment of the present disclosure. As shown in FIG. 5, after an app is started, the app registers a push function and initializes LruCache which is used for storing the identifier of a push message. Only after the push function is registered, a client where the app is located can receive messages pushed by a push service end. LruCache is used for saving information of push messages. The number threshold of LruCach can be set as required, such as 5 or 10. The number threshold of LruCache is used to represent the number of push messages corresponding to the information of push messages that can be stored in LruCache. If the number threshold is too large, it may result in a waste of memory.

Figure 6:
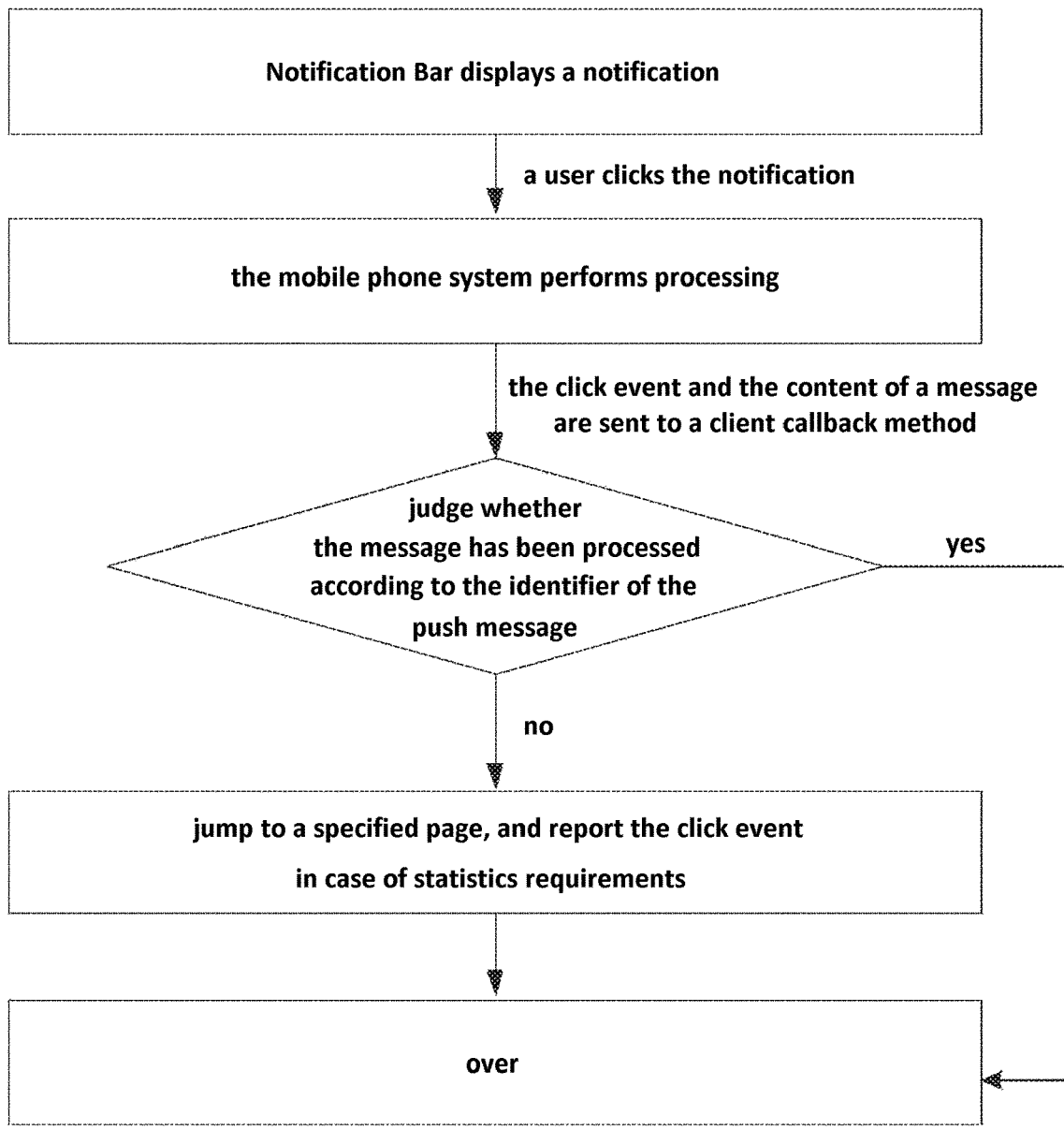
FIG. 6 is a flowchart of a method for processing a notification trigger message provided in yet another embodiment of the present disclosure.

FIG. 6 is a flowchart of a method for processing a notification trigger message provided in yet another embodiment of the present disclosure. As shown in FIG. 6, the Notification Bar of the terminal displays a notification; after a user clicks the content of the notification, the terminal system performs processing, and sends the click event and the content of a recommended message to a callback method in the app; according to the identifier of the recommended message, it is judged whether or not the recommended message has been processed; if the recommended message has not been processed, the notification click message associated with the recommended message is a message that needs to be processed, and subsequent operations such as interface jumping and statistical data analysis are performed; if the recommended message has been processed, terminate the process.

The method in the embodiment of the present disclosure can solve a loophole of the terminal system in the processing of quick clicks on an identical notification: one notification message only triggers one jump processing and statistically analyzes only one click event.

Figure 7:
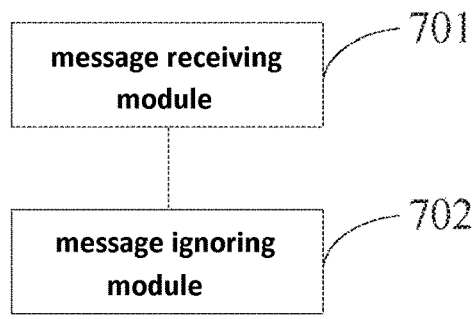
FIG. 7 is a schematic diagram of an apparatus for identifying an abnormal behavior provided in one embodiment of the present disclosure.

As shown in FIG. 7, the embodiment of the present disclosure provides an apparatus for identifying an abnormal behavior, comprising:

a message receiving module 701 configured to receive a notification trigger message, wherein the notification trigger message includes an identifier of a current push message;

a message ignoring module 702 configured to determine whether the identifier of the current push message exists in a message cache, and if the identifier exists in the message cache, ignore the notification trigger message, wherein the message cache is used for storing an identifier of a push message corresponding to a notification that has been responded to.

In one embodiment of the present application, the message ignoring module 702 is configured to determine whether the identifier of the current push message exists in a message cache, wherein the message cache is used for storing an identifier of a push message corresponding to a notification that has been responded to.

In one embodiment of the present application, the message cache is used for storing a historical timestamp of a push message corresponding to a notification that has been responded to, and the notification trigger message also includes a current timestamp.

The apparatus also comprises:

a time updating module 703 configured to update the historical timestamp of the current push message in the message cache to the current timestamp.

In one embodiment of the present, the method further comprises:

an information storage module 704 configured to store, if the identifier of the current push message does not exist in the message cache, the identifier of the current push message in the message cache.

In one embodiment of the present, the notification trigger message also includes a current timestamp, and the information storage module 704 is configured to store the current timestamp in the message cache, wherein the identifier of the current push message corresponds to the current timestamp thereof.

In one embodiment of the present, the apparatus also comprises:

an information deleting module 705 configured to determine whether the content stored in the message cache reaches a preset storage threshold, and if the content reaches the threshold, delete the earliest historical timestamps and the identifiers of the corresponding push messages in the message cache.

In one embodiment of the present disclosure, the message ignoring module 702 is configured to determine whether a time interval between the historical timestamp and the current timestamp of the current push message is smaller than a preset interval threshold, and if the time interval is smaller than the threshold, execute the ignoring of the notification trigger message.

In one embodiment of the present disclosure, the message ignoring module 702 is configured to determine whether a terminal where the message cache is located satisfies the preset running conditions, and if the terminal does not satisfy the conditions, execute the ignoring of the notification trigger message.

In one embodiment of the present, the running conditions include any one or more of the following: the CPU utilization rate is less than a preset first threshold, the memory usage amount is less than a preset second threshold, the disk usage amount is less than a preset third threshold, a current terminal interface is not a game running interface, and a current terminal interface is not a video playing interface.

The embodiment of the present disclosure provides an electronic device, comprising:
  one or more processors;
  a storage device for storing one or more programs which, when executed by the one or more processors, cause the one or more processors to implement the method according to any of the above embodiments.

Figure 8:
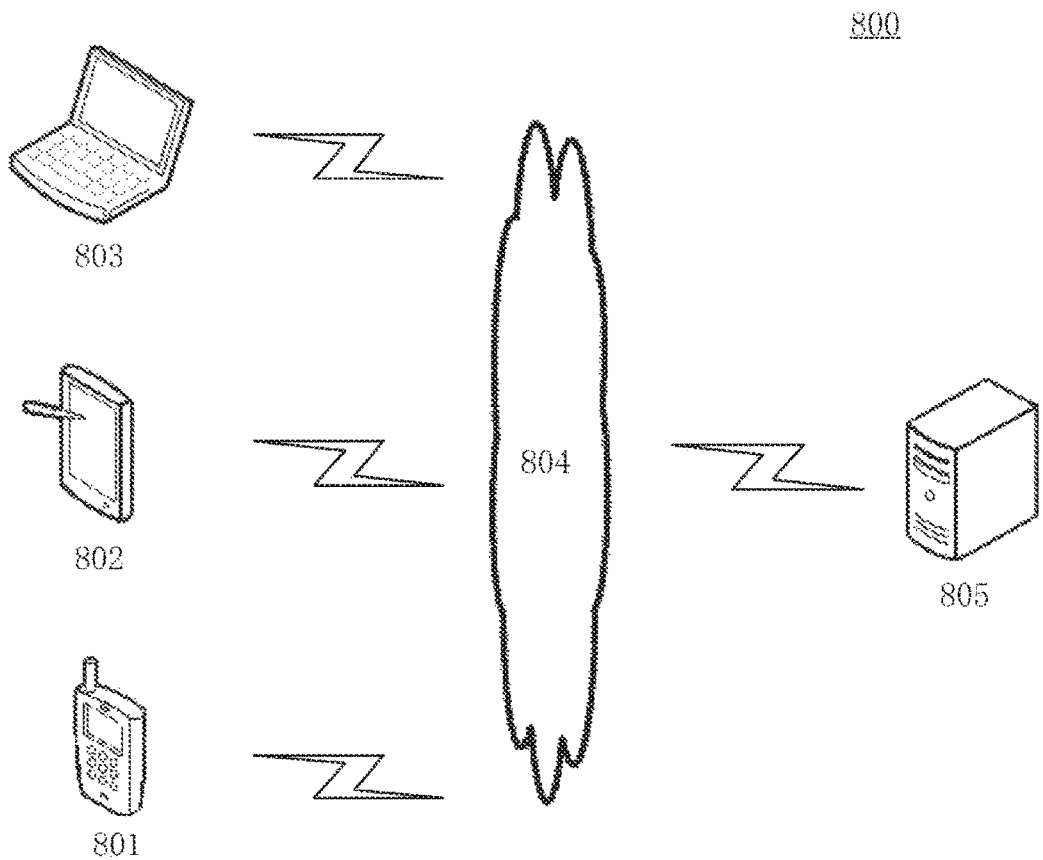
FIG. 8 is an exemplary system architecture diagram in which the embodiments of the present disclosure can be applied.

FIG. 8 shows an exemplary system architecture 800 in which the method for identifying an abnormal behavior or the apparatus for identifying an abnormal behavior according to the embodiments of the present disclosure can be applied.

As shown in FIG. 8, the system architecture 800 may comprise terminal devices 801, 802, 803, a network 804 and a server 805. The network 804 is used for providing a medium for communication links between the terminal devices 801, 802, 803 and the server 805. The network 804 may include various types of connection types, such as wired links, wireless communication links, fiber-optic cables and the like.

A user can use the terminal devices 801, 802, 803 to interact with the server 805 through the network 804, so as to receive or send a message or the like. On the terminal devices 801, 802, 803, various communication client applications can be installed, such as shopping applications, web browser applications, search applications, instant messaging tools, email clients, social platform software, office applications, and so on (which are only exemplary).

The terminal devices 801, 802, 803 may be various electronic devices with a display screen and supporting web browsing, including but not limited to smart phones, tablet computers, laptop-type portable computers, desktop computers, and so on.

The server 805 may be a server which provides various services, such as a backend management server (which is only exemplary) which provides support for shopping websites browsed by users via the terminal devices 801, 802, 803. The backend management server can process, such as analyze, the received product information query request and other data, and feedback the processing results (such as target push information, product information—only exemplary) to the terminal devices.

It should be noted that: the method for processing a notification trigger message in the embodiments of the present disclosure is generally performed by the terminal devices 801, 802, 803. Accordingly, the apparatus for processing a notification trigger message is generally disposed in the terminal devices 801, 802, 803.

It should be understood that the number of the terminal devices, the network and the server is only illustrative in FIG. 8. The system architecture 800 may comprise any number of terminal devices, networks and servers according to the implementation requirements.

Figure 9:
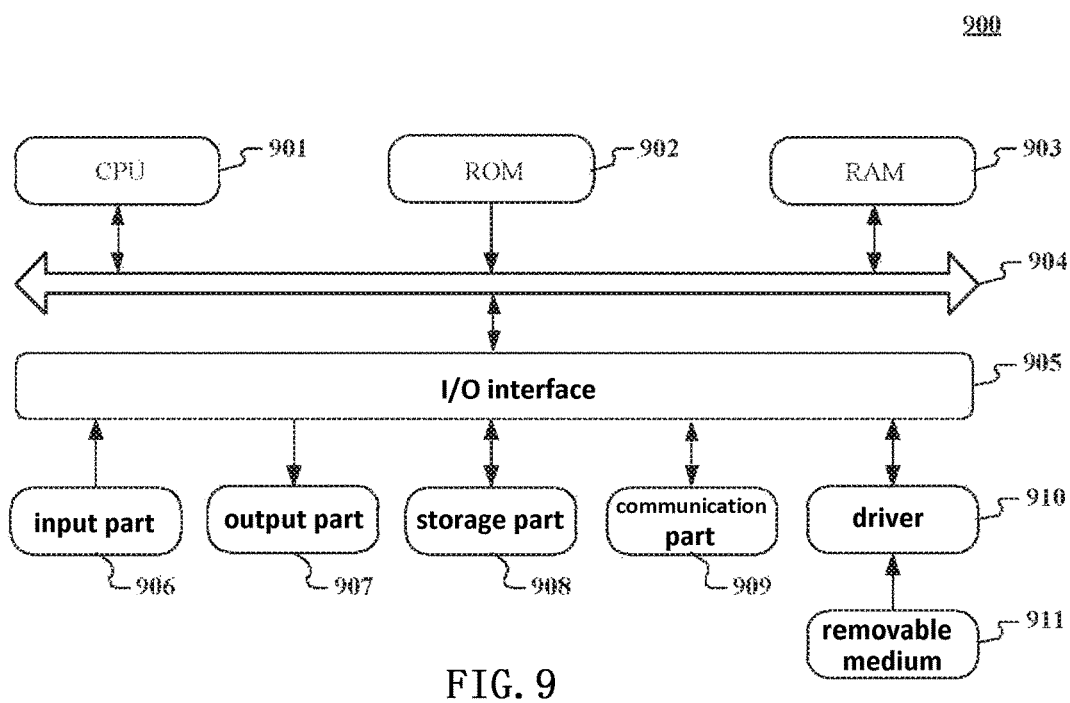
FIG. 9 is a schematic structural diagram of a computer system of terminal devices or servers suitable for implementing the embodiments of the present disclosure.

Referring now to FIG. 9, which is a schematic structural diagram of a computer system 900 of terminal devices suitable for implementing the embodiments of the present disclosure. The terminal devices shown in FIG. 9 are only exemplary, and should not construe any limitations of the function and scope of use of the embodiments of the present disclosure.

As shown in FIG. 9, the computer system 900 comprises a central processing unit (CPU) 901, which can perform various appropriate actions and processing according to a program stored in a read only memory (ROM) 902 or a program loaded from a storage part 908 to a random access memory (RAM) 903. In the RAM 903, various programs and data required for operations of the system 900 are also stored. The CPU 901, ROM 902, and RAM 903 are connected to one another through a bus 904. An input/output (I/O) interface 905 is also connected to the bus 904.

The following components are connected to the I/O interface 905: an input part 906 including a keyboard, a mouse, etc.; an output part 907 including a cathode ray tube (CRT), a liquid crystal display (LCD), a speaker, etc.; a storage part 908 including a hard disk, etc.; and a communication part 909 including a network interface card such as a LAN card, a modem, etc. The communication part 909 performs communication processing via a network such as the Internet. A driver 910 is also connected to the I/O interface 905 as needed. A removable medium 911, such as a magnetic disk, an optical disk, a magneto-optical disk, a semiconductor memory or the like, is installed on the driver 910 as needed, such that computer programs read from the driver 910 can be installed in the storage part 908 as needed.

In particular, according to the embodiments of the present disclosure, the process described above with reference to flowcharts can be implemented as a computer software program. For example, the embodiments of the present disclosure comprise a computer program product, which comprises a computer program carried on a computer-readable medium, the computer program including a program code for executing the method as shown in the flowcharts. In such embodiments, the computer program may be downloaded and installed from the network through the communication part 909, and/or installed from the removable medium 911. When the computer program is executed by the central processing unit (CPU) 901, the above functions defined in the system of the present disclosure are performed.

It should be noted that: the computer-readable medium in the present disclosure may be a computer-readable signal medium or a computer-readable storage medium or any combination thereof. The computer-readable storage medium may be, for example, but not limited to, an electrical, magnetic, optical, electromagnetic, infrared, or semiconductor system, apparatus, or device, or any combination thereof. More specific examples of the computer-readable storage medium may include, but not limited to, an electrical connection with one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof. In the present disclosure, a computer-readable storage medium may be any tangible medium that contains or stores a program, which may be used by or in combination with an instruction execution system, apparatus, or device. In the present disclosure, a computer-readable signal medium may include a data signal propagated in a baseband or as a part of a carrier, in which a computer-readable program code is carried. The data signal which is propagated in this way may be in various forms, including but not limited to an electromagnetic signal, an optical signal, or any suitable combination thereof. The computer-readable signal medium may also be any computer-readable medium other than the computer-readable storage medium. The computer-readable medium may send, propagate, or transmit a program for use by or in combination with an instruction execution system, apparatus or device. The program code contained on the computer-readable medium can be transmitted by any suitable medium, including but not limited to: wireless medium, wire, optical cable, RF, etc., or any suitable combination thereof.

The flowcharts and block diagrams in the drawings illustrate the system architecture, functions, and operations, which may be implemented, of the system, method, and computer program product according to various embodiments of the present disclosure. In this regard, each block in the flowcharts or block diagrams may represent a module, a program segment, or a part of the code, which includes one or more executable instructions for realizing the specified logic functions. It should be also noted that: in some alternative implementations, the functions marked in the blocks may also occur in a different order from the order marked in the drawings. For example, two blocks shown successively can be actually executed in parallel substantially, and they can sometimes be executed in a reverse order, depending on the functions involved. It should also be noted that: each block in the block diagrams or flowcharts and a combination of blocks in the block diagrams or flowcharts can be implemented by a dedicated hardware-based system that performs specified functions or operations, or can be implemented by a combination of dedicated hardware and computer instructions.

The involved modules described in the embodiments of the present disclosure can be implemented in software or hardware. The described modules may also be provided in a processor which is, for example, described as a processor comprising a sending module, an acquiring module, a determining module, and a first processing module, wherein the names of these modules do not construe limitations of the modules themselves in a certain circumstance. For example, the sending module can also be described as "a module for sending an image to a connected server end to acquire a request".

As another aspect, the present disclosure also provides a computer-readable medium, which may be included in the device described in the above embodiments or may exist alone without being assembled into the device. The above computer-readable medium carries one or more programs which, when executed by a device, causes the device to perform operations including:

receiving a notification trigger message, wherein the notification trigger message includes an identifier of a current push message;

determining, according to the identifier of the current push message, whether the current push message needs to be processed;

if the identifier of the current push message exists in a message cache, ignoring the notification trigger message.

In the technical solution according to the embodiments of the present disclosure, whether a current push message needs to be processed is determined based on the identifier of the current push message, and if the identifier of the current push message exists in a message cache, the notification trigger message corresponding to the current push message is ignored. Therefore, multiple responses of a client to an identical notification can be avoided, and thereby the system resources are saved and the user experiences of the terminal are improved.

The above embodiments do not construe definitions of the scope of protection of the present disclosure. Those skilled in the art should understand that various modifications, combinations, sub-combinations and substitutions may occur depending on the design requirements and other factors. Any modifications, equivalent substitutions and improvements, and the like within the spirit and principle of the present disclosure should be contained in the scope of protection of the present disclosure.

The invention claimed is:

1. A method for receiving a notification trigger message, comprising:

receiving a notification trigger message formed by triggering a notification, wherein the notification trigger message includes an identifier of a current push message corresponding to the notification;

determining whether the identifier of the current push message exists in a message cache, and if the identifier exists in the massage cache, ignoring the notification trigger message, wherein the message cache is provided in a hard disk, a memory, or an external storage and used for storing an identifier of a push message corresponding to a notification that has been responded to, wherein the message cache is used for storing a historical timestamp of a push message corresponding to a notification that has been responded to;

the notification trigger message also includes a current timestamp, if the identifier of the current push message exists in the message cache, the method further comprises:

updating the historical timestamp of the current push message in the message cache to the current timestamp, so as to facilitate understanding of execution circumstances of the push message, if the identifier of the current push message does not exist in the message cache. determining whether content stored in the message cache reaches a preset storage threshold, and if the content reaches the preset storage threshold, deleting the earliest historical timestamps and the identifiers of the corresponding push messages in the message cache, and if the content does not reach the preset storage threshold, storing the current timestamp into the message cache, wherein the identifier of the current push message corresponds to the current timestamp thereof.

2. The method according to claim 1, wherein if the identifier of the current push message exists in the message cache, the method further comprises:

determining whether a time interval between the historical timestamp and the current timestamp of the current push message is smaller than a preset interval threshold, and if the time interval is smaller than the preset interval threshold, executing the ignoring of the notification trigger message.

3. The method according to claim 1, further comprising:

if the identifier of the current push message does not exist in the message cache, determining whether a terminal where the message cache is located satisfies preset running conditions, and if the terminal does not satisfy the preset running conditions, executing the ignoring of the notification trigger message.

4. The method according to claim 3, wherein the running conditions include any one or more of the following:
the CPU utilization rate is less than a preset first threshold,
the memory usage amount is less than a preset second threshold,
the disk usage amount is less than a preset third threshold,
a current terminal interface is not a game running interface, and
a current terminal interface is not a video playing interface.

5. An apparatus for processing a notification trigger message, comprising:
at least one processor configured to:
receive a notification trigger message formed by triggering a notification, wherein the notification trigger message includes an identifier of a current push message corresponding to the notification;
determine whether the identifier of the current push message exists in a message cache, and if the identifier exists in the message cache, ignore the notification trigger message, wherein the message cache is provided in a hard disk, a memory, or an external storage and used for storing an identifier of a push message corresponding to a notification that has been responded to,
wherein
the message cache is used for storing a historical timestamp of a push message corresponding to a notification that has been responded to;
the notification trigger message also includes a current timestamp,
if the identifier of the current push message exists in the message cache, the method further comprises:
updating the historical timestamp of the current push message in the message cache to the current timestamp, so as to facilitate understanding of execution circumstances of the push message,
if the identifier of the current push message does not exist in the message cache, determining whether content stored in the message cache reaches a preset storage threshold, and
if the content reaches the preset storage threshold, deleting the earliest historical timestamps and the identifiers of the corresponding push messages in the message cache, and
if the content does not reach the preset storage threshold, storing the current timestamp into the message cache, wherein the identifier of the current push message corresponds to the current timestamp thereof.

6. A computer-readable medium storing thereon a computer program which, when executed by the processor(s), implements a method for receiving a notification trigger message and comprising:
receiving a notification trigger message formed by triggering a notification, wherein the notification trigger message includes an identifier of a current push message corresponding to the notification;
determining whether the identifier of the current push message exists in a message cache, and if the identifier exists in the message cache, ignoring the notification trigger message, wherein the message cache is provided in a hard disk, a memory, or an external storage and used for storing an identifier of a push message corresponding to a notification that has been responded to,
wherein
the message cache is used for storing a historical timestamp of a push message corresponding to a notification that has been responded to;
the notification trigger message also includes a current timestamp,
if the identifier of the current push message exists in the message cache, the method further comprises:
updating the historical timestamp of the current push message in the message cache to the current timestamp, so as to facilitate understanding of execution circumstances of the push message,
if the identifier of the current push message does not exist in the message cache, determining whether content stored in the message cache reaches a preset storage threshold, and
if the content reaches the preset storage threshold, deleting the earliest historical timestamps and the identifiers of the corresponding push messages in the message cache, and
if the content does not reach the preset storage threshold, storing the current timestamp into the message cache, wherein the identifier of the current push message corresponds to the current timestamp thereof.

7. The computer-readable medium according to claim 6, wherein
if the identifier of the current push message exists in the message cache, the method further comprises:
determining whether a time interval between the historical timestamp and the current timestamp of the current push message is smaller than a preset interval threshold, and
if the time interval is smaller than the preset interval threshold, executing the ignoring of the notification trigger message.

8. The computer-readable medium according to claim 6, the computer program implements the method further comprising:
if the identifier of the current push message does not exist in the message cache, determining whether a terminal where the message cache is located satisfies preset running conditions, and
if the terminal does not satisfy the preset running conditions, executing the ignoring of the notification trigger message.

9. The computer-readable medium according to claim 8, wherein the running conditions include any one or more of the following:
the CPU utilization rate is less than a preset first threshold,
the memory usage amount is less than a preset second threshold,
the disk usage amount is less than a preset third threshold,
a current terminal interface is not a game running interface, and
a current terminal interface is not a video playing interface.

* * * * *